May 23, 1961

R. A. BROWN 2,985,766

STATIC CONTROL UNIT WITH FEEDBACK WINDING AND CAPACITORS

Filed Dec. 27, 1956

"OR" UNIT

"NOT" UNIT

INVENTOR.
Russell A. Brown
BY Martin Kalikow
HIS ATTORNEY

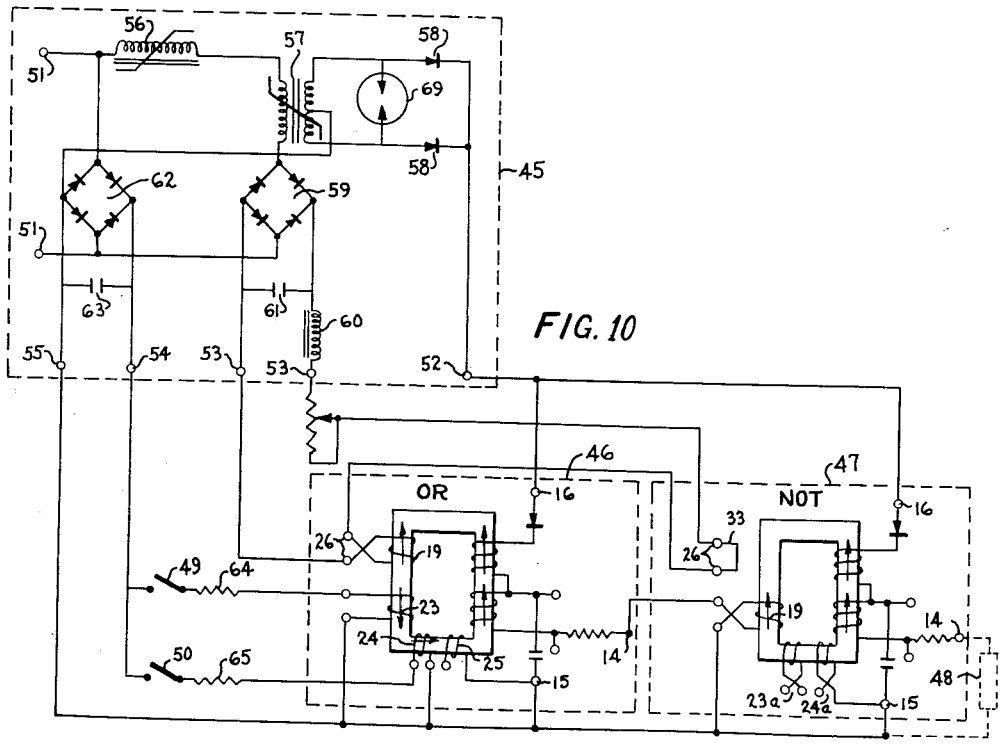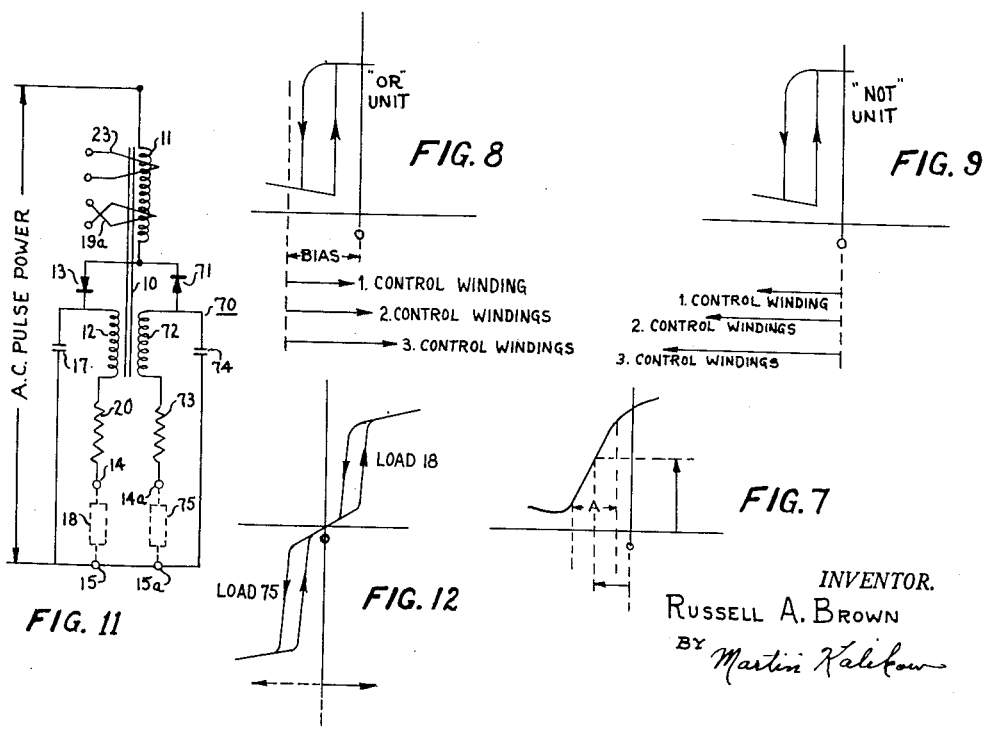

United States Patent Office 2,985,766
Patented May 23, 1961

2,985,766
STATIC CONTROL UNIT WITH FEEDBACK WINDING AND CAPACITORS

Russell A. Brown, Bloomington, Ill., assignor to General Electric Company, a corporation of New York Filed Dec. 27, 1956, Ser. No. 630,936

6 Claims. (Cl. 307—88)

My invention relates to magnetic control apparatus and more particularly to magnetic-amplifier type control elements, units and systems adapted to perform the elemental or "logical" control functions required in the automatic and semiautomatic operation of industrial tools and machinery.

Modern industrial tools and machinery such as punch presses, drill presses, lathes, etc., are now capable of performing many and varied shaping, cutting, and forming operations substantially automatically. The control equipment for such tools and machinery is becoming ever more complex and expensive as manufacturing plants move toward more complete mechanization and "automation." Conventional magnetic relays, solenoids and limit switches employing separable contacts are well adapted for the control of machinery destined to perform relatively simple operations but are not adapted, from the point of view of size, expense, reliability, and circuitry involved, to control machinery destined to perform complicated and differing operations in response to a variety of control signals and influences often in many different sequences.

In order to meet this need for more versatile and reliable controls, it has been suggested that control devices be provided which do not have moving contacts and which are capable of statically switching electric currents or impulses in accord with basic logical or elemental-control functions which make up the control systems. These "elemental control devices" have become known, for example, as "and," "or," "not," "memory" or "delay" units acording to the particular control function which they can perform. These elemental-control devices have heretofore consisted of combinations of rectifiers and electromotive forces in intricate networks such as used in electronic computers and have utilized magnetic or electronic amplifiers between each rectifier network to replace the losses resulting from the network.

Accordingly, one object of the invention is to provide magnetic-control elements and circuits, and elemental-control devices, utilizing these control elements and circuits, which have no moving contacts and are suitable for use in control systems capable of accomplishing complex control functions.

Another object of the invention is to provide elemental contactless control devices or circuits in which a magnetic amplifier control element is capable of itself performing the elemental-control function without the loss of signal strength or the necessity of intricate rectifier networks.

Among the problems involved in using conventional magnetic amplifiers energized by a conventional alternating current low frequency sinusoidal power supply for such contactless elemental-control devices are their relatively heavy weight, large size, and expense and their insensitivity to very low power signals. Their use has therefore been largely restricted to specially engineered higher power applications where size and expense are not a major consideration. Accordingly, another important object of the invention is to provide magnetic-amplifier type contactless control elements, devices and circuits operable from a pulse power supply with high sensitivity and fast response at low power levels and having small size, light weight, and low cost. A further object is to provide pulse power responsive magnetic amplifier circuit elements versatile enough to be used as general purpose control components in many different types of control circuits and systems without requiring specialized engineering knowledge or modification.

The term "pulse power" is used herein to mean a source of periodic pulses of electric voltage and current each pulse having an abrupt rise and fall and having a much shorter duration than the duration of a half wave of sinusoidal current at 60 cycles. Preferably the ratio of pulse time to no-pulse time during each cycle is considerably less than .1 and the voltage rise along the pulse wave front occurs during less than 3 degrees of a sinusoidal wave at 60 cycles. For example, square-wave pulses of 400 microseconds duration at a repetition frequency of 120 pulses per second has been found to be excellent for the intended purpose.

Among the technical problems involved in the use of magnetic amplifiers for elemental-control devices is the fact that the output v. signal current characteristics in most small, and particularly half-wave, magnetic amplifiers have only a moderate analog rate of rise between the output current levels at saturation and non-saturation. As a consequence, it is possible to achieve many different output current levels in response to different amplitude input signals. For elemental-control devices, however, it is preferable that the magnetic amplifier be able to operate only at two distinct output levels, one corresponding to an "on" condition and the other corresponding to an "off" condition, and that the device operate as a snap-acting switch between these two output conditions. Accordingly, a further object of the invention is to provide a magnetic-amplifier type control element having a signal v. output current characteristic giving snap acting switching operation between two distinct output current levels in response to signals of varying amplitudes.

In general, in accord with the invention a magnetic-control element is provided in which a gate winding and a feedback winding are mounted on a magnetic core and are connected in series with each other and with a rectifier for connection in series with a load across a source of pulse power. Means, such as a capacitor, is connected to the feedback winding for sustaining current through the feedback winding during the intervals between pulses with a sufficient amount of regeneration to achieve a steep front input v. output current characteristic in the core between positive and negative saturation levels despite the relatively short duration of the power pulse.

Magnetic-amplifier control circuits and devices for fulfilling various "logic functions" are provided in accord with the invention by including means for introducing additional magnetic flux in the core of this magnetic-control element in response to various control or "signal" influences. This additional control flux may be introduced by virtue of the proximity or movement of auxiliary permanent magnets or electromagnets but is preferably introduced by virtue of electric currents flowing through additional control windings on the magnetic core. The signal currents may be unidirectional or alternating and may be pulsating, intermittent, sinusoidal or constant depending upon the magnetic effects desired. It has been found, however, that an unusually simple and compatible system of "logic type" control devices can be formed by utilizing signal and output currents which are unidirectional and only slightly pulsating. In accord with an important further feature of the invention this is accomplished by utilizing the means for sustaining the feedback currents also to sustain the load currents and by utilizing these sustained load currents as the signal currents for succeeding control units in the system.

The novel features believed characteristic of the invention are set forth in the appended claims. The invention itself, however, together with further objects and advantages thereof may be easily understood by referring to the following description taken in connection with the accompanying drawing in which:

Figs. 7, 8 and 9 are curves or plots of typical input v. output current characteristics of the elemental-control circuits of Figs. 2 and 3 under various conditions and are useful in explaining the operation of the circuits thereof;

Fig. 10 is a circuit diagram of a simple control system using the elemental-control circuits and devices of the invention;

Fig. 11 is a modification of the invention for use with a source of alternating-current pulse power; and Fig. 12 is an input v. output current characteristic of the circuit of Fig. 11.

Figure 1:
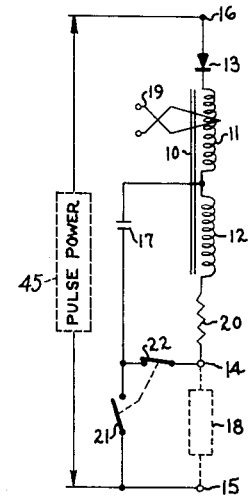
Fig. 1 is a circuit diagram of a magnetic-control element embodying the invention.

Referring to Fig. 1 one basic form of the invention is shown as comprising a magnetic core 10 of high-permeability magnetic material such as Deltamax having mounted thereon a gate winding 11 and a feedback winding 12. Windings 11 and 12 are connected in series with each other and with a rectifier 13 and with a pair of output terminals 14, 15. The entire series circuit is adapted to be connected through power terminals 15, 16 to a source of alternating or unidirectional pulse power 45. If a unidirectional source of pulse power is selected, rectifier 13 must, of course, be polarized and connected in a direction to pass the power pulse. A current limiting resistor 20 may also be connected in this series circuit preferably between feedback winding 12 and terminal 14.

In accord with the invention, means are provided for sustaining current through feedback winding 12 proportional to the load-current pulse after the pulse has passed. In Fig. 1 this is accomplished by connecting a capacitor 17 in parallel circuit relation with the feedback winding 12. Depending upon the position of ganged switches 21 and 22 capacitor 17 may be connected in parallel with winding 12 and resistor 20 or in parallel with winding 12, resistor 20 and an electric load impedance 18 connected between output terminals 14, 15. Resistor 20 may be omitted or its value varied if the impedances of winding 12 and load 18 are great enough to achieve the desired feedback and output currents. Interconnected load impedance 18 may be a resistance, capacitance or inductance or any desired combination thereof. For use in elemental-control systems, load impedance 18 may conveniently comprise the control winding of a succeeding magnetic-control device in the system.

Control means are also provided for introducing additional magnetic flux in core 10 in response to electric or mechanical signals. In Fig. 1 this control means is shown as comprising a control winding 19 but may alternatively comprise, for example a permanent magnet movable mechanically into proximity with core 10. The direction of such signal introduced magnetic flux in core 10 relative to that produced therein by gate winding 11 and feedback winding 12 depends of course upon the direction of the winding turns and the direction of current flow within these windings. Feedback winding 12 is wound and connected on core 10 in flux aiding relation with gate winding 11. As will be more fully explained hereinafter, control winding 19 may be connected to a signal which introduces flux either aiding or opposing that produced by gate winding 11 depending upon the control characteristics desired. Additional control windings may be also included on core 10 for biasing the core or for subjecting the core to other control signals.

In the operation of the circuit of Fig. 1, presume switch 21 open and switch 22 closed and no signal on control winding 19. A power pulse supplied across power-receiving terminals 15 and 16 is applied through load impedance 18, capacitor 17, and rectifier 13 across gate winding 11 until core 10 saturates whereupon gate winding 11 conducts or "fires" passing a pulse of output current through load impedance 18 and charging capacitor 17. After the passage of the power pulse, capacitor 17 discharges through feedback winding 12 and resistor 20 thereby sustaining during the usual relaxation period flux in core 10 proportional to the magnitude of load current flowing during the power pulse. This feedback flux is in the same direction as that produced by the gate winding during its conducting period. It will be observed that capacitor 17 can not discharge through gate winding 11 because of the presence of rectifier 13. The rate of discharge of capacitor 17 is determined by the impedance of winding 12 and resistor 20 and the values of these components are adjusted to keep core 10 in a substantially saturated state during this relaxation period at the repetition frequency of the pulse-power source. If the frequency is high enough and the impedance of feedback winding great enough, resistor 20 may be omitted and winding 12 connected directly to terminal 14.

When a unidirectional signal current is suppplied to control winding 19 in a direction to produce magnetic flux in core 10 opposing that produced by windings 11 and 12, there is no effect upon the impedance of gate winding 11, which continues to pass the entire power pulse, until the magnitude of the control signal generates flux sufficient to overcome the saturating effects produced by the presence of rectifier 13, feedback winding 12, and capacitor 17. Once the magnitude of the signal current begins to overcome the saturating effects of these components and thereby begins to hold off and decrease the duration of the power pulse passing to the load impedance 18, the amplitude of feedback current passing through winding 12 during the relaxation period is also reduced. As a consequence core 10 is not driven so deeply into the saturation region and the cumulative degenerative effect of these changes is to cause the core quickly to snap from a complete positively saturated condition into a complete negatively saturated condition in which the only load current flowing is the magnetizing current of the core. A similar cumulative regenerative effect occurs when the signal current amplitude decreases to a point where load current begins to increase whereupon the core quickly snaps from complete negative saturation to complete positive saturation. A typical resulting input v. output current characteristic curve is shown in Fig. 9. The benefits of the invention are quickly apparent if this characteristic curve is contrasted with that of Fig. 7 which shows the input v. output current characteristic curve which would occur if capacitor 17 were removed from the circuit thereby eliminating this feedback signal. It will be observed in Fig. 7 that there is a wide region A of signal currents in which the output current will be neither at minimum nor maximum levels.

With switch 21 closed and switch 22 open the operation of the circuit of Fig. 1 is identical to that as described above with the exception that the charging path of capacitor 17 does not include load impedance 18 while the discharge path of capacitor 17 does include load impedance 18 as well as resistor 20 and feedback winding 12. If load impedance 18 has a low ohmic value; for example, if load impedance 18 comprises the control winding of a succeeding magnetic-control element, the discharge time is substantially the same as that described above when switch 22 is closed and switch 21 open. With switch 21 closed and switch 22 open, however, current is sustained through load impedance 18 by the discharge of capacitor 17 after the power pulse has passed, and the voltage wave applied across load impedance 18 constitutes a unidirectional pulsating inverted sawtooth-shaped wave rather than periodically recurring unidirectional pulses corresponding to the power pulses applied.

Figure 2:
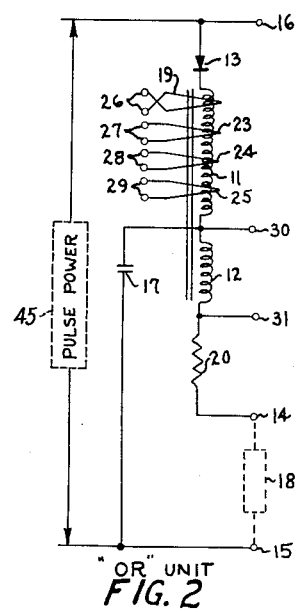
Figs. 2 and 3 are schematic diagrams respectively of two elemental-control circuits in accord with the invention.
Figure 3:
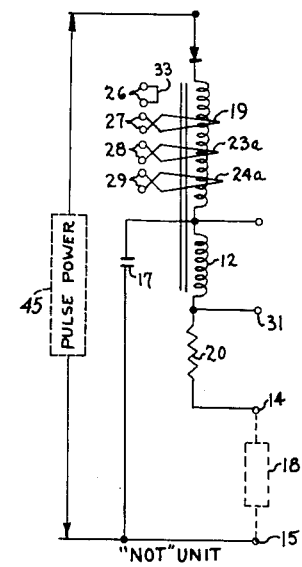

Referring now to Figs. 2 and 3 I have shown two elemental-control devices or units employing the magnetic-control element circuit of Fig. 1. The circuit of Fig. 2 is known as an "or" unit and is identical to the circuit of Fig. 1 with switch 21 closed and switch 22 open with the exception that several additional control windings 23, 24 and 25 are included on core 10. A plurality of pairs of input terminals 26, 27, 28 and 29 are provided for the control windings and two additional output terminals 30 and 31 are preferably provided, one at the connection between capacitor 17 and feedback winding 12 and the other at the juncture between feedback winding 12 and resistor 20. Output terminals 30 and 31 permit the take-off of additional output currents of higher magnitude and also enable additional electrical impedances or short circuits to be connected across feedback winding 12 or resistor 20 for special purposes.

In the operation of this "or" unit circuit of Fig. 2, a substantially constant voltage is supplied across terminals 26 of control winding 19 to produce a biasing current therein causing flux in core 10 opposing that produced by gate winding 11. As shown in Fig. 8, the magnitude of this bias current is sufficient to hold core 10 in its negatively saturated condition such that only a small core magnetizing current flows through the load circuit. The remaining control windings 23, 24, and 25 are all arranged and connected to produce flux in core 10 aiding the gate winding flux and opposing the flux produced by the bias current in winding 19. A signal current in any one or more of these control windings, if sufficient to overcome the bias winding flux, drives the unit with snap action into its positively saturated state, thereby permitting load current to flow. It will thus be seen that load current will flow when a signal of sufficient amplitude is supplied to control winding 23, or control winding 24 or control winding 25 or any combination thereof.

The circuit of Fig. 3 is known as a "not" unit and is identical to that of the "or" unit circuit of Fig. 2 with the exceptions that one of the control windings is replaced by a jumper conductor 33 between its input terminals and the remaining control windings are all arranged and connected to produce signal flux in core 10 opposing the flux produced by gate winding 11. In the operation of this "not" unit, no biasing current is supplied to any of the control windings 19, 23a or 24a. As will be more fully explained hereinafter, jumper 33 is provided for maintaining continuity of a series circuit through which bias current is supplied to other elemental-control units in a control system. As illustrated in Fig. 9, with no bias on core 10 the unit normally operates at positive saturation with a high level of load current flowing. When a signal current is supplied to any one or more of the control windings 19, 23a and 24a, the core is driven with a snap action from this positively saturated condition to a negatively saturated condition in which only a small level of magnetizing load current is flowing. In both the "or" unit of Fig. 2 and the "not" unit of Fig. 3 it will be appreciated that the higher output current level at positive core saturation corresponds to the "on" condition of the circuit while the lower current level at negative saturation corresponds to the "off" condition of the circuit.

Figure 4:
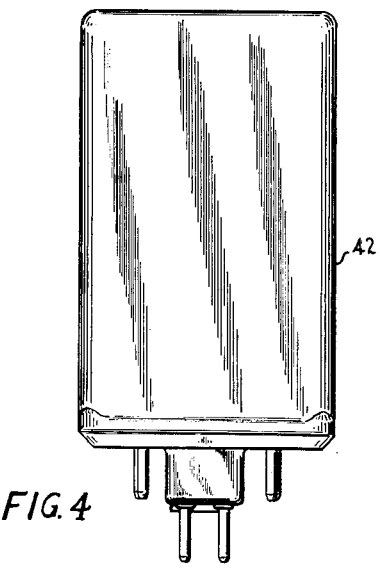
Fig. 4 is a front view.
Figure 5:
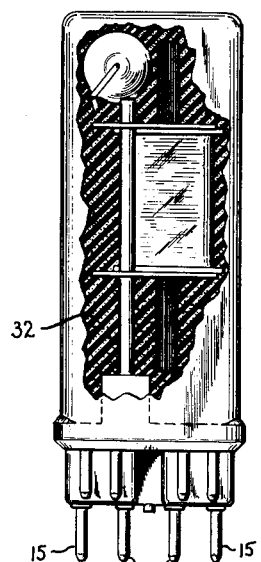
Fig. 5 is a side view, with a portion of the case broken away, of one suitable construction for elemental-control device in accord with the circuits of Fig. 2.
Figure 6:
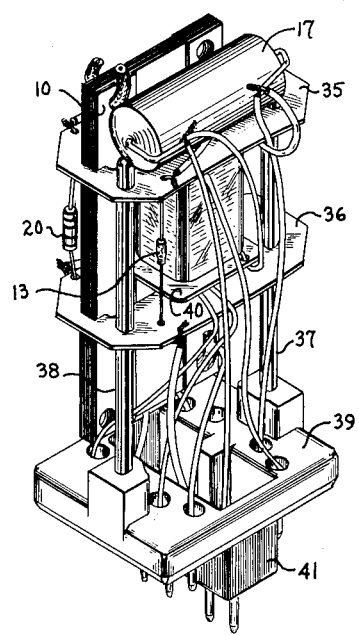
Fig. 6 shows the internal physical construction of the elemental-control device of Figs. 4 and 5.

One suitable mechanical construction for elemental-control devices corresponding to the circuits of Figs. 2 and 3 is shown in Figs. 4, 5 and 6. The electric components are mounted on a pair of fiber plates 35, 36 supported by a pair of posts 37, 38 on an insulating plastic base 39. In these figures the electric components are designated by the same reference numerals as in the circuit diagrams. For simplicity and economy all of the windings are concentrically wound upon a spool 40 mounted on one leg of a closed-loop rectangular core member 10. The terminals of the units are preferably of the plug-in prong type and extend downwardly from base 39. The power pulse receiving terminals 15 and 16 and the bias control winding terminals 26 extend from a central step 41 in base member 39 while the remaining terminals extend from base member 39 on opposite sides of this central step 41. Although in the circuit diagram each of the control windings is shown connected to a pair of input terminals independently, in the actual device one side of a control winding may be connected to the same prong as some other control winding or electric component destined to be connected to the same point in the electric circuit of a control system. The control units are encased within an aluminum can 42 and are preferably further supported and sealed therein by being embedded in a suitable sponge-like compound 32. The mechanical construction of these control units is not my invention and forms a portion of the subject matter described and claimed in a co-pending application Serial No. 691,775, filed October 22, 1957 in the name of Charles Adams and assigned to the same assignee as the present invention. Details of the mechanical structure are more fully described in this Adams application.

Referring to Fig. 10 I have shown a simplified control system utilizing elemental-control circuits in accord with the invention. A power supply 45 shown within a dashed rectangular line in the upper lefthand corner of the figure supplies pulse power, bias current and original input signal current to an "or" unit 46 and a "not" unit 47. The objective of the circuit is to supply an output current through a load impedance 48 at all times except when either or both control switches 49 and 50 are closed. The power supply 45 has a pair of input terminals 51 for receiving an alternating sinusoidal power frequency voltage, a pulse power output terminal 52, a pair of bias current supplying output terminals 53, an original signal current output terminal 54 and a common return terminal 55 for the signal current and pulse power outputs. A saturable reactor 56, a saturable transformer 57 and a full wave rectifier 58 within power supply 45 convert the alternating sinusoidal input voltage into periodically recurring unidirectional power pulses of relatively short duration compared to the interval between pulses between terminals 52 and 55 at a frequency of 120 pulses per second. A thyrite disc element 69 connected across the secondary of pulse transformer 57 serves to clip the peaks of the output pulses to a constant voltage amplitude. Another full wave rectifier 59 in series with the primary of transformer 57 together with another reactor 60 and a capacitor 61 provide unidirectional substantially constant output current between terminals 53. Yet another full wave rectifier 62 connected directly across input terminals 51 together with a capacitor 63 provide unidirectional substantially constant output current between terminals 54 and 55.

As shown in Fig. 10, the pulse power available at terminals 52 and 55 is connected to the power receiving terminals 15 and 16 of both "or" and "not" units 46, 47. The bias current available at output terminals 53 is connected to the bias-signal-receiving terminals 26 in series circuit relationship, and it is for this purpose that jumper 33 is provided within "not" unit 47. Because of this series circuit connection of the bias windings of the units, any current flowing through the primary winding of pulse transformer 57 must also flow through these bias windings. Consequently any failure in the bias windings or bias circuit will also open or interrupt the circuit of current flowing to the pulse transformer and extinguish the output power pulse. The system is thus "fail safe" with respect to a failure in bias current.

Control windings 23 and 24 of "or" unit 46 are connected respectively in parallel with signal current terminals 54 and 55 of power supply 45 through switches 49 and 50 and current-limiting resistors 64 and 65. In more complicated circuits another signal current may be supplied to control winding 25. The output voltage of "or" unit 46 at terminal 14 is connected across a load impedance comprising one control winding 19 of the "not" unit 47. The remaining control windings 23a and 24a are available for other control signals in more complicated circuits. The output voltage of "not" unit 47 at its output terminal 14 is applied across load impedance 48.

In the operation of the circuit of Fig. 10 in the absence of a signal on the "not" unit control winding 19, the core of "not" unit 47 is in a positively saturated condition and a high level of output current flows through load impedance 48. Actually, in the normal condition of the circuit only a low level of signal current flows through control winding 19 of "not" unit 47 corresponding to the magnetizing current of the "or" unit 46, and this small signal current is not sufficient to drive the core of "not" unit 47 out of its saturated state.

The "or" unit 46, however, is normally in a negatively saturated condition due to the bias current in its control winding 19; but when a signal current is passed through its control windings 23 or 24 as a result of the closure of switches 49 or 50, the core is snapped over to its positively saturated condition thereby allowing a high level of output current to flow through the control winding 19 of "not" unit 47. When this occurs, the core of "not" unit 47 is driven with snap action into its negatively saturated state and the output current through load impedance 48 is reduced to its maximum output current level.

Referring now to Figs. 11 and 12 I have shown a further modification of my invention whereby it may utilize both positive and negative polarity pulses of an alternating-current pulse-power source. It will be appreciated that a portion of the circuit of Fig. 11 is identical with that of Fig. 1 with the exception that rectifier 13 is connected between the gate winding 11 and feedback winding 12 instead of ahead of the gate winding 11. In addition, another load and feedback circuit 70 is provided comprising a rectifier 71, feedback winding 72, resistor 73, and capacitor 74 identical to, and connected in parallel with, the load and feedback winding circuit comprising rectifier 13, feedback winding 12, resistor 20, and capacitor 17 of the original circuit. Rectifier 71, however, is reversely poled relative to rectifier 13 and both feedback windings 12 and 72 are wound and connected to produce flux in core 10 aiding the gate winding flux during their respective conducting periods.

In the operation of the circuit of Fig. 11 currents tend to flow through gate winding 11, rectifier 13, and capacitor 17 during pulses of one polarity and through gate winding 11, rectifiere 71, and capacitor 74, during pulses of opposite polarity. During the time between pulses each of the capacitors attempts to discharge through its associated feedback winding 12 or 72 but the magnetic flux induced in the core due to such capacitor discharge is always in a direction opposite to the magnetic flux introduced in the core due to the pulse-power voltage being simultaneously applied across gate winding 11. Thus, in the absence of a signal current supplied to control windings 19a or 23 the core 10 never saturates and the entire voltage of the pulse-power source is developed across the combination of the gate winding 11 and the feedback windings 12 and 72. Consequently, no load current flows in either load impedance 18 or load impedance 75.

When a signal current is supplied to one control winding 23 in one direction, for example, a positive signal current, core 10 is driven into positive saturation causing gate winding 11 to conduct and pass positive load current through rectifier 13 to load impedance 18. Due to the presence of feedback winding 12, the current through load 18 increases with a snap action from a substantially zero "off" level to the high current "on" level. When a signal current is supplied to control winding 23 in an opposite (negative) direction, or through a different control winding 19a wound in an opposite direction, core 10 is driven into negative saturation and gate winding 11 conducts current through rectifier 71 and load impedance 75 during negative polarity pulses of the power source. Due to the presence of feedback winding 72, the current through load impedance 75 likewise increases with a snap action from a substantially zero "off" level to the full "on" level. When used in an entire control system, it will be appreciated that load impedances 18 and 75 may constitute control windings of succeeding stages of magnetic amplification.

The signal v. output current characteristics of the circuit of Fig. 11 are shown in Fig. 12. It will be observed from these characteristics, that the control unit of Fig. 11 may be utilized as either an "or" unit or "not" unit merely by reversing the direction of signal current and selecting one of the output voltages at output terminals 14, 15 or 14a, 15a to energize the desired load device.

It will be thus seen that I have provided a versatile and small contactless magnetic-control element and magnetic-amplifier type control circuits, and elemental control devices, operable from a pulse-power supply with a snap acting switching characteristic. These elements, circuits and devices, have the advantages of small size, light weight and low cost as a result of their pulse-power mode of operation. Because of their inherent amplifying properties each control stage incorporating such circuit or device is capable of operating a succeeding stage without intermediate amplification. In the typical elemental-control devices of Figs. 2 through 6, rectifier 13 consists of a small germanium diode, resistor 20 has a resistance of 7,500 ohms, capacitor 17 has a capacitance of 2 microfarads, core 10 consists of a rectangular stack of laminations ⅛" thick and ⅜" wide. The windings all consist of number 36 wire 0.005" diameter with gate winding 11 having 1,000 turns, feedback winding 12 having 200 turns, and each of the control windings having 1,000 turns. The signal currents supplied to the control windings are of the order of 0.005 amperes and the power-pulses supplied to the power-receiving terminals 15 and 16 are approximately square-wave pulses having a voltage amplitude of 55 volts and a duration of 400 microseconds at a frequency of 120 pulses per second.

Although I have described my invention above in connection with specific circuits and embodiments thereof, many modifications may be made, and it is to be understood therefore that I intend to cover all such modifications as fall within the true spirit and scope of the invention.

What I claim as new and desire to secure by Letters Patent of the United States is:

1. A pulse power responsive control apparatus adapted to be connected to a source of periodic power pulses characterized in that each pulse has a duration which is short compared to the interval between pulses, said apparatus comprising: a rectifier, a magnetic core of high permeability and having two permissible saturation conditions; means for introducing signal fluxes in said core to cause said core to shift from one to another of said saturation conditions; a gate winding and a feedback winding on said core connected in flux aiding relation and in series circuit with each other and with said rectifier for connection in series with an electric impedance across said source of pulse power; and means including a capacitor connected in parallel with said feedback winding for regeneratively sustaining current through said feedback winding during the intervals between power pulses, said capacitor and said feedback winding being constructed to provide sufficient feedback flux in said core during the interval between said power pulses to retain said core in one of its saturation conditions in the absence of signal flux, and to snap said core into the opposite of said saturation conditions upon the introduction of a signal flux by said flux introducing means having an amplitude sufficient to overcome said one saturation condition.

2. A pulse-power responsive control system comprising: a source of periodic power pulses having a duration which is short compared to the interval between pulses, a rectifier, a magnetic core, a gate winding and a feedback winding connected in flux aiding relation on said core and in series circuit with each other and with said rectifier and said source of periodic power pulses for connection across an electric impedance, a capacitor connected in parallel circuit relation with said feedback winding, means for introducing signal fluxes in said core to cause said core to shift from one to another of its allowable saturation conditions, the reactance of said capacitor and the winding turns of said feedback winding being selected to provide sufficient feedback flux in said core during the interval between said power pulses to retain said core in one of its saturation conditions in the absence of signal flux, and to snap said core into the opposite of said saturation conditions upon the introduction of a signal flux by said flux introducing means having an amplitude sufficient to overcome said one saturation condition.

3. A pulse-power responsive control system comprising: a source of periodic power pulses having a duration which is short compared to the interval between pulses; a magnetic core having a high magnetic permeability and possessing two permissible saturation conditions; a gate winding and a feedback winding on said core connected in flux aiding relation and in series circuit with each other; a load circuit comprising a rectifier and a load impedance connected in series with said windings and said source of power pulses; at least one control winding on said magnetic core for introducing signal fluxes in said core to cause said core to shift from one to another of its saturation conditions; and a capacitor connected in parallel with said feedback winding and said load impedance, the reactance of said capacitor, and the magneto-motive force of said feedback winding being selected to provide sufficient feedback flux in said core during the interval between said power pulses to retain said core in one of its saturation conditions in the absence of signal flux, and to snap said core into the opposite of said saturation conditions upon the introduction of a signal flux having an amplitude sufficient to overcome said one saturation condition.

4. A pulse-power responsive control system comprising: a source of periodic power pulses having a duration which is short compared to the interval between pulses, a rectifier, a resistor, a magnetic core of high permeability, means including at least one control winding on said core for introducing signal fluxes in said core, a gate winding and a feedback winding on said core connected in flux aiding relation and in series circuit with each other and with said rectifier and resistor for connection in series with an electric impedance across said source of pulse power, and a capacitor connected in parallel circuit relation with said feedback winding for sustaining current through said feedback winding after the passage of a power pulse supplied to said series circuit, said feedback winding having in the neighborhood of 0.2 times the number of turns of said gate winding, the reactance of said capacitor and the winding turns of said feedback winding being selected to provide sufficient feedback flux in said core during the interval between said power pulses to retain said core in one of its saturation conditions in the absence of signal flux, and to snap said core into the opposite of said saturation conditions upon the introduction of a signal flux by said flux introducing means having an amplitude sufficient to overcome said one saturation condition.

5. A pulse-power responsive control apparatus adapted to be connected to a source of periodic power pulses characterized in that each pulse has a duration which is short compared to the interval between pulses, said apparatus comprising a rectifier; a load impedance; a magnetic core having two permissible saturation conditions and having thereon a gate winding, a feedback winding, a bias winding, and at least two control windings, said gate and feedback windings being connected in flux aiding relation on said core and in series circuit with each other and with said rectifier, and load impedance, across said source of power pulses, said bias winding being arranged to produce when energized a substantially constant bias flux in said core which opposes flux produced by said gate and feedback windings and which has a magnitude sufficient to retain the core in one of said saturation conditions, said control windings being arranged to produce when energized control flux in said core opposing said bias flux; and capacitive reactance means connected to said feedback winding for sustaining current through said feedback winding during the intervals between said power pulses, the reactance of said capacitive reactance means, and the magneto-motive force of said feedback winding being selected to provide sufficient feedback flux in said core during the interval between said power pulses to retain said core in the other of its saturation conditions in the absence of bias flux, and to snap said core into said other of said saturation conditions upon the introduction of a control flux having an amplitude sufficient to overcome the bias flux.

6. A pulse-power responsive control system comprising: a source of periodic power pulses having a duration which is short compared to the interval between pulses; a rectifier; a resistor; a load impedance; a magnetic core having two permissible saturation conditions and having thereon a gate winding, a feedback winding, a bias winding, and at least two control windings, said gate and feedback windings being connected in flux aiding relation on said core and in series circuit with each other and with said rectifier, resistor, and load impedance, across said source of power pulses, said bias winding being arranged to produce when energized a substantially constant bias flux in said core which opposes flux produced by said gate and feedback windings and which has a magnitude sufficient to retain the core in one of said saturation conditions, said control windings being arranged to produce when energized control flux in said core opposing said bias flux; and capacitive reactance means connected to said feedback winding for sustaining current through said feedback winding during the intervals between said power pulses, the reactance of said capacitive reactance means, the resistance of said resistor and the magneto-motive force of said feedback winding being selected to provide sufficient feedback flux in said core during the interval between said power pulses to retain said core in the other of its saturation conditions in the absence of bias flux, and to snap said core into said other of said saturation conditions upon the introduction of a control flux having an amplitude sufficient to overcome the bias flux.

References Cited in the file of this patent
UNITED STATES PATENTS

| | | |
|---|---|---|
| 2,690,536 | Adams | Sept. 28, 1954 |
| 2,733,306 | Bedford | Jan. 31, 1956 |
| 2,754,470 | Franklin | July 10, 1956 |
| 2,777,959 | Richardson | Jan. 15, 1957 |